(12) United States Patent
Kitahara (10) Patent No.: US 12,155,285 B2
(45) Date of Patent: Nov. 26, 2024

(54) ACTUATOR AND LID WITH PRESSING CONVEX PORTIONS

(71) Applicant: NIDEC SANKYO CORPORATION, Nagano (JP)

(72) Inventor: Hiroshi Kitahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 434 days.

(21) Appl. No.: 17/498,704

(22) Filed: Oct. 11, 2021

(65) Prior Publication Data

US 2022/0123644 A1 Apr. 21, 2022

(30) Foreign Application Priority Data

Oct. 16, 2020 (JP) .................................. 2020-174577

(51) Int. Cl.
*H02K 33/18* (2006.01)

(52) U.S. Cl.
CPC .................................... *H02K 33/18* (2013.01)

(58) Field of Classification Search
CPC .................................................... H02K 33/18
See application file for complete search history.

(56) References Cited

U.S. PATENT DOCUMENTS

| | | | |
|---|---|---|---|
| 10,451,134 B2 | 10/2019 | Kanaya | |
| 2011/0187215 A1* | 8/2011 | Sahara | H02K 5/1732 310/90 |
| 2018/0294690 A1 | 10/2018 | Takeda et al. | |
| 2019/0103783 A1* | 4/2019 | Kondo | F04D 25/06 |
| 2020/0161955 A1 | 5/2020 | Kitahara et al. | |
| 2021/0305878 A1* | 9/2021 | Hinata | H02K 5/24 |
| 2021/0336520 A1* | 10/2021 | Mori | H02K 33/16 |

(Continued)

FOREIGN PATENT DOCUMENTS

| | | |
|---|---|---|
| CN | 107420479 | 12/2017 |
| JP | 10311367 A * | 11/1998 |
| JP | 2007155069 | 6/2007 |

(Continued)

OTHER PUBLICATIONS

Muramatsu (JP 10311367 A) English Translation (Year: 1998).*

(Continued)

*Primary Examiner* — Tulsidas C Patel
*Assistant Examiner* — Robert E Mates
(74) *Attorney, Agent, or Firm* — JCIPRNET (57) ABSTRACT

An actuator is provided. A movable body oscillating in an actuator has a shaft, and first and second inner frame members fixed to the shaft. A support body has a cylindrical case, a first and second lid members fixed to the ends of the case, and a first and second outer frame members disposed inside the case. The first inner frame member is connected to the first outer frame member by the first connecting body, and the second inner frame member is connected to the second outer frame member by the second connecting body. The first lid member has a pressing convex portion which abuts the first outer frame member, and the second lid member has a pressing convex portion which abuts the second outer frame member. The number of the pressing convex portions arranged spaced apart along the circumference direction is limited to two or three.

6 Claims, 7 Drawing Sheets

(56) References Cited

U.S. PATENT DOCUMENTS

2021/0336521 A1* 10/2021 Ando ................. H02K 33/18
2022/0224213 A1* 7/2022 Kasahara ............. H01F 7/081

FOREIGN PATENT DOCUMENTS

| JP | 2008099523 A | * | 4/2008 |
| JP | 2008228456 | | 9/2008 |
| JP | 2011167004 | | 8/2011 |
| JP | 2019013086 | | 1/2019 |
| WO | 2019003876 | | 1/2019 |

OTHER PUBLICATIONS

Furuichi (JP 2008099523 A) English Translation (Year: 2008).*
"Office Action of China Counterpart Application", issued on Apr. 28, 2023, with English translation thereof, pp. 1-18.

* cited by examiner

ACTUATOR AND LID WITH PRESSING CONVEX PORTIONS

CROSS REFERENCE TO RELATED APPLICATION

The present invention claims priority under 35 U.S.C. § 119 to Japanese Application No. 2020-174577 filed Oct. 16, 2020, and the entire content of which is incorporated herein by reference.

BACKGROUND

Field of the Invention

An at least an embodiment of the present invention relates to an actuator for relatively moving a movable body with respect to a support body.

Description of the Related Documents

Conventionally, there is an actuator which is provided with a support body, a movable body, and a magnetic drive mechanism to oscillate the movable body with respect to the support body, wherein the movable body is connected to the support body by an elastic and viscoelastic connecting body. Japanese Patent Laid-open Publication No. 2019-13086 discloses an actuator in which a movable body is disposed inside a rectangular parallelepiped cover and the movable body oscillates in a longitudinal direction of the cover. A connecting body of the actuator disclosed in Japanese Patent Laid-open Publication No. 2019-13086 is a gel-like member formed in a way that cuts a sheet-like gel into a rectangular shape. The movable body includes a yoke to which a magnet is fixed, and the gel-like member one side of which adheres to the yoke and the other side of which adheres to the cover member in the thickness direction of the gel-like member.

SUMMARY

A configuration disclosed in Japanese Patent Laid-open Publication No. 2019-13086 was difficult to handle the actuator because it employs a cut gel-like member as a single component. Therefore, the inventors of the present invention have proposed an actuator, which accommodates a movable body inside a cylindrical case and oscillates the movable body in the axial direction, employing a part as a dumper member connecting an annular inner frame and an annular outer frame by a cylindrical gel-like member (connecting body) positioned in a gap between the annular inner frame and the annular outer frame. The gel-like member is manufactured in a way that fills gel material between the inner frame and the outer frame and then solidifies it (i.e., casting).

The actuator devised by the inventors of the present invention is provided with a support body including: a cylindrical case for enclosing a periphery of the outer frame; and lid members to close both ends of the case. When assembling the actuator, the inner frame of the damper member is fixed to a shaft which is a part on the side of the movable body, and the outer frame is fixed to the case. In order to fix the outer frame to the case, the actuator employs a fixing structure including: a step provided on an inner circumference of the case, to which the outer frame abuts in an axial direction, so that the lid member presses the outer frame against the step to fix the outer frame.

However, the fixing structure, in which the lid member presses the outer frame against the step, may be assembled with the lid member abutting the outer frame unevenly depending on accuracy of parts or an assembly. In such a case, there is a problem that a chattering noise occurs because uncontacted portions hit each other when the movable body oscillates.

In light of the above-mentioned problems, the present invention suppresses the noise occurring when a movable body oscillates.

According to an aspect of the invention, an actuator according to at least an embodiment of the present invention includes: a support body and a movable body; a connecting body, connected to the support body and the movable body, having at least one of elasticity and viscoelasticity; and a magnetic drive mechanism, having a magnet and a coil, and being configured to cause the movable body to relatively move with respect to the support body. One of the movable body and the support body includes: a shaft to support one of the magnet and the coil at inside of an inner circumference of the other of the movable body and the support body; and an inner frame that surrounds outside of an outer circumference of the shaft. The other of the movable body and the support body includes: an outer frame that faces the inner frame in a radial direction; a case with a cylindrical shape that surrounds outside of an outer circumference of the outer frame; and a lid member that closes an end of the case. The inner frame is connected to the outer frame by the connecting body with a cylindrical shape that is disposed in a gap between the inner frame and the outer frame. The lid member includes a pressing convex portion that abuts the outer frame, and two or three of the pressing convex portions are arranged at positions spaced apart from each other along a circumference direction.

In at least an embodiment of the present invention, one of the movable body and the support body includes the shaft, and the other of the movable body and the support body includes the cylindrical case and the lid member. The connecting body connecting the movable body to the support body is fixed to the case via the outer frame. The lid member closing the end of the case includes the pressing convex portion which abuts the outer frame, and two or three of the pressing convex portions are arranged at positions spaced apart from each other along the circumference direction. In this way, by limiting the number of the pressing convex portions to two or three, when the outer frame is fixed to the case by the lid member, all of the pressing convex portions abut the outer frame. This allows the lid member to avoid colliding with the outer frame when the movable body oscillates, so that it is possible to suppress chattering noise.

In the at least an embodiment of the present invention, the case includes a restriction portion configured to abut a locking portion provided on the lid member, and the restriction portion is configured to restrict the lid member coming off from the case. A circumferential arrangement of the pressing convex portion is preferably different from that of the locking portion. When the pressing convex portion abuts the outer frame, it becomes difficult for the abutted portion to flex. By shifting the position of the pressing convex portion with respect to that of the locking portion, it is possible to avoid that it becomes difficult for the portion provided with the locking portion to flex. This allows the locking portion to avoid that it becomes difficult to lock it to the restriction portion when fixing the lid member to the case. Therefore, it is possible to avoid that it becomes difficult to fix the lid member to the case.

In the at least an embodiment of the present invention, the lid member is configured to be press-fitted into the end of the case. The locking portion is preferably a claw portion that elastically deforms in the radial direction and elastically contact an inner circumferential surface of the case. In the structure where the claw portion is assembled by elastically deforming the claw portion, if the claw portion is provided at the same position as the pressing convex portion, it is difficult to press-fit the claw portion into the case since the pressing convex portion abutting the outer frame makes it difficult to flex that portion. In the at least an embodiment of the present invention, since the position of the pressing convex portion is shifted with respect to that of the claw portion, it is possible to avoid that it becomes difficult to fix the lid member to the case.

In the at least an embodiment of the present invention, the locking portions are provided at a plurality of positions which are spaced apart along the circumference direction. The pressing convex portion is preferably disposed at an intermediate position between the locking portions adjacent to each other along the circumference direction. This allows the distance between the pressing convex portion and the locking portion to be maximum, so that it becomes easy for the portion provided with the locking portion to bend. Therefore, since this allows the locking portions to avoid that it becomes difficult to lock them to the restriction portions, it allows the lid members to avoid that it becomes difficult to fix them to the case.

In the at least an embodiment of the present invention, the pressing convex portions are preferably arranged along the circumference direction at equal intervals.

When the locking portion is disposed between adjacent pressing convex portions along the circumference direction, this allows the distance between the pressing convex portion and the locking portion to unlikely become narrow. Therefore, it is possible to become easy for the portion where the locking portion is provided to flex.

In the at least an embodiment of the present invention, the lid member preferably includes a plastic deformation portion which protrudes from a tip surface of the pressing convex portion. When attaching the lid member, this allows the plastic deformation portion to be pressed and collapsed between the lid member and the outer frame. Therefore, even if the accuracy of parts or assembly is low, it is possible to cause the pressing convex portion to abut the outer frame.

In at least an embodiment of the present invention, one of the movable body and the support body includes the shaft, and the other of the movable body and the support body includes the cylindrical case and the lid member. The connecting body connecting the movable body to the support body is fixed to the case via the outer frame. The lid member closing the end of the case includes the pressing convex portion which abuts the outer frame, and two or three of the pressing convex portions are arranged at positions spaced apart from each other along the circumference direction.

In this way, by limiting the number of the pressing convex portions to two or three, when the outer frame is fixed to the case by the lid member, all of the pressing convex portions abut the outer frame. This allows the lid member to avoid colliding with the outer frame when the movable body oscillates, so that it is possible to suppress chattering noise.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Now, at least one embodiment of the present invention is described with reference to the drawings. In the following description, an axial direction is defined as a direction in which a central axis L of a movable body 3 extends, a notation L1 is defined as one side of the axial direction, and a notation L2 is defined as the other side of the axial direction. In an actuator 1 applying at least one embodiment of the present invention, the movable body 3 oscillates in the axial direction with respect to a support body 2.

In the at least one embodiment described below, although the movable body 3 is disposed inwardly along the inner circumference of the support body 2, in at least one embodiments of the present invention the movable body 3 may be disposed outwardly along the outer circumference the support body 2. Furthermore, in the at least one embodiment described below, although the movable body 3 is connected to the support body 2 by a connecting body 10 at two locations, that is, L1 that is one side of the axial direction and L2 that is the other side of the axial direction, in the at least one embodiment of the present invention the connecting body 10 may be arranged at one or three or more locations. Moreover, in the at least one embodiment described below, although a magnetic drive mechanism 6 to oscillate the movable body 3 with respect to the support body 2 includes a magnet 61 disposed on the movable body 3 and a coil 62 disposed on the support body 2, in the at least one embodiment of the present invention a position of the magnet 61 and that of the coil 62 may be replaced with each other. Namely, the magnetic drive mechanism 6 may be provided with the coil 62 disposed on the movable body 3 and the magnet 61 disposed on the support body 2.

[Entire Configuration]

Figure 1:
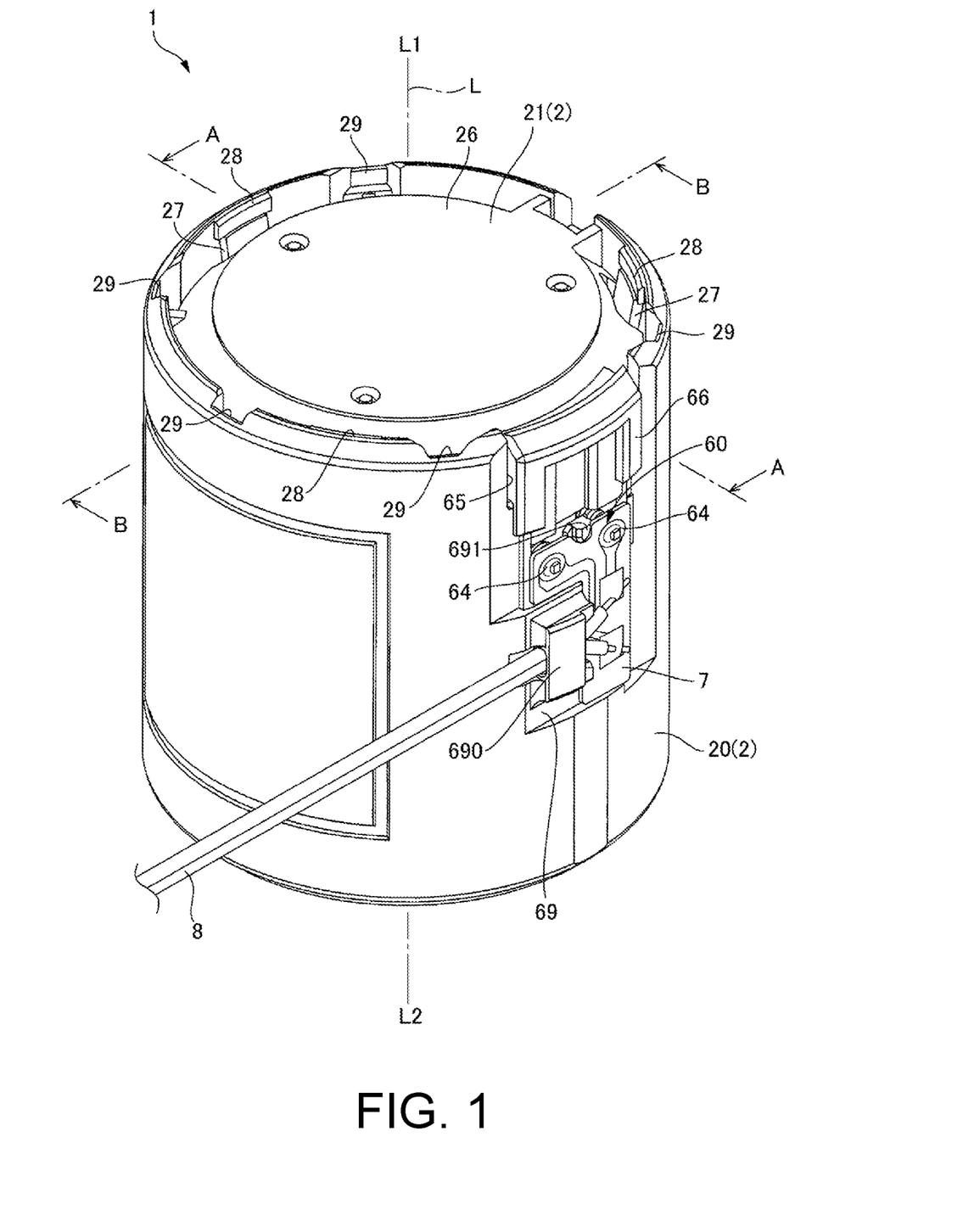
FIG. 1 is a perspective view of an actuator according to an embodiment of the present invention.
Figure 2:
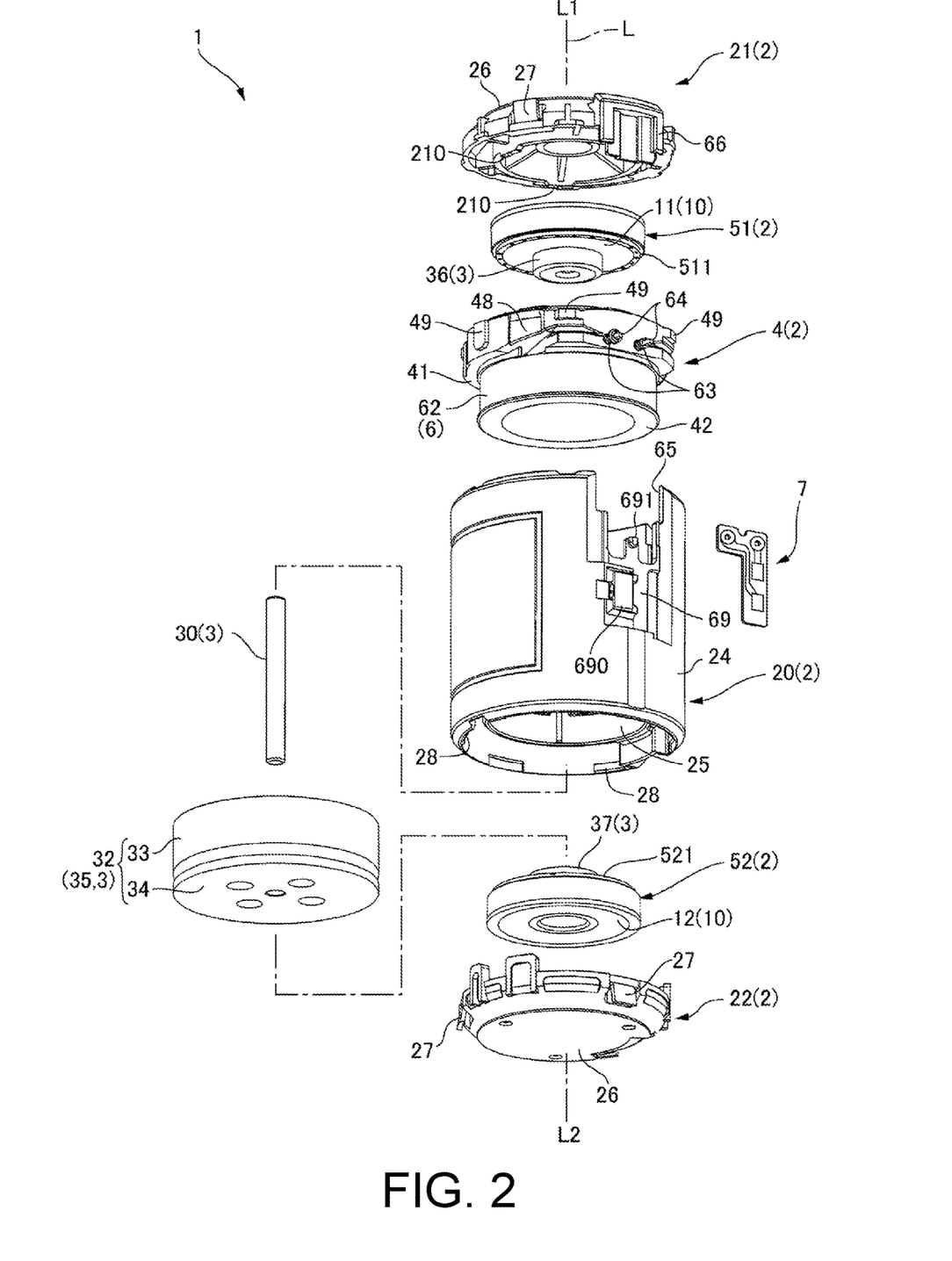
FIG. 2 is an exploded perspective view of the actuator shown in FIG. 1.
Figure 3:
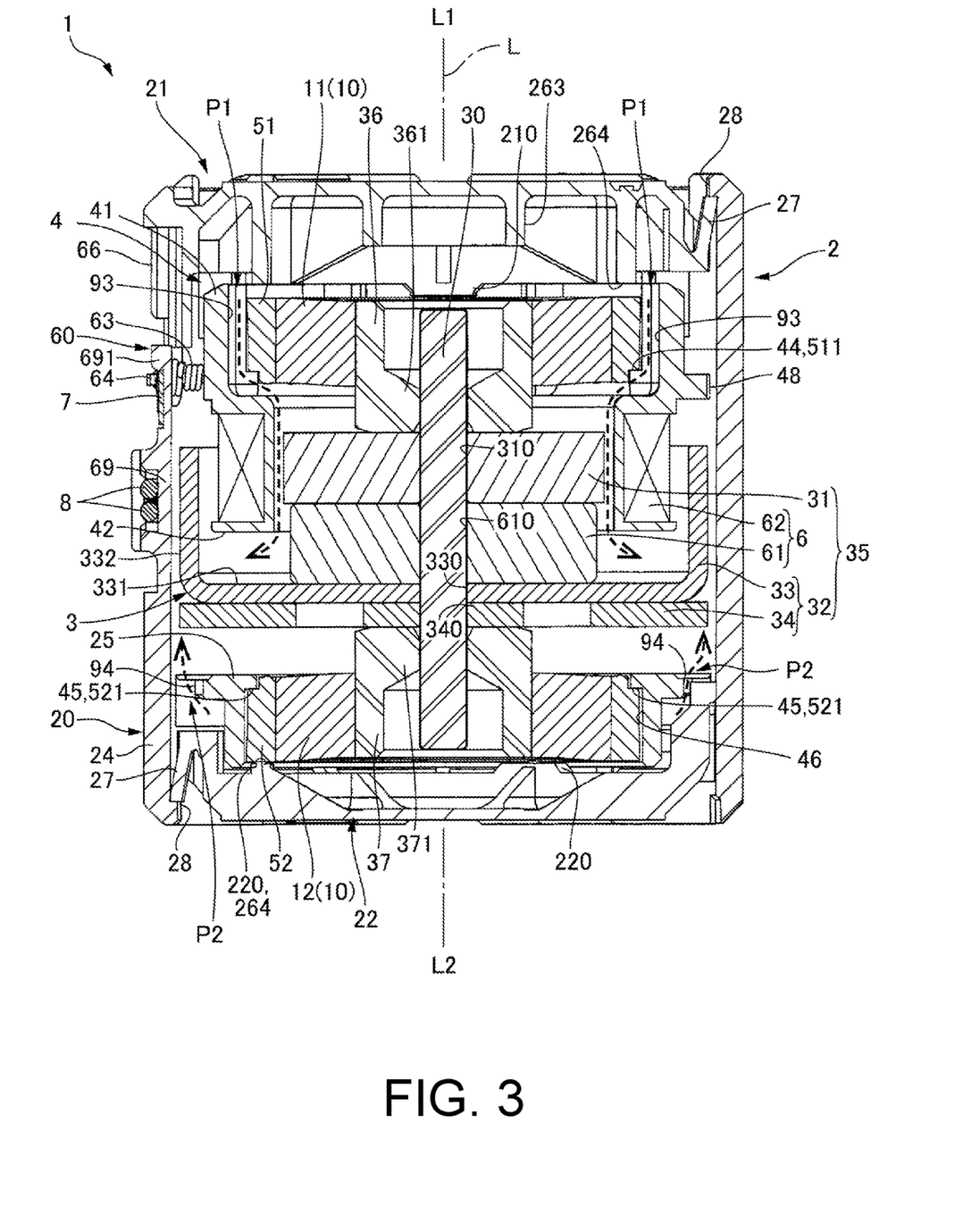
FIG. 3 is an A-A cross-sectional view of the actuator shown in FIG. 1.
Figure 4:
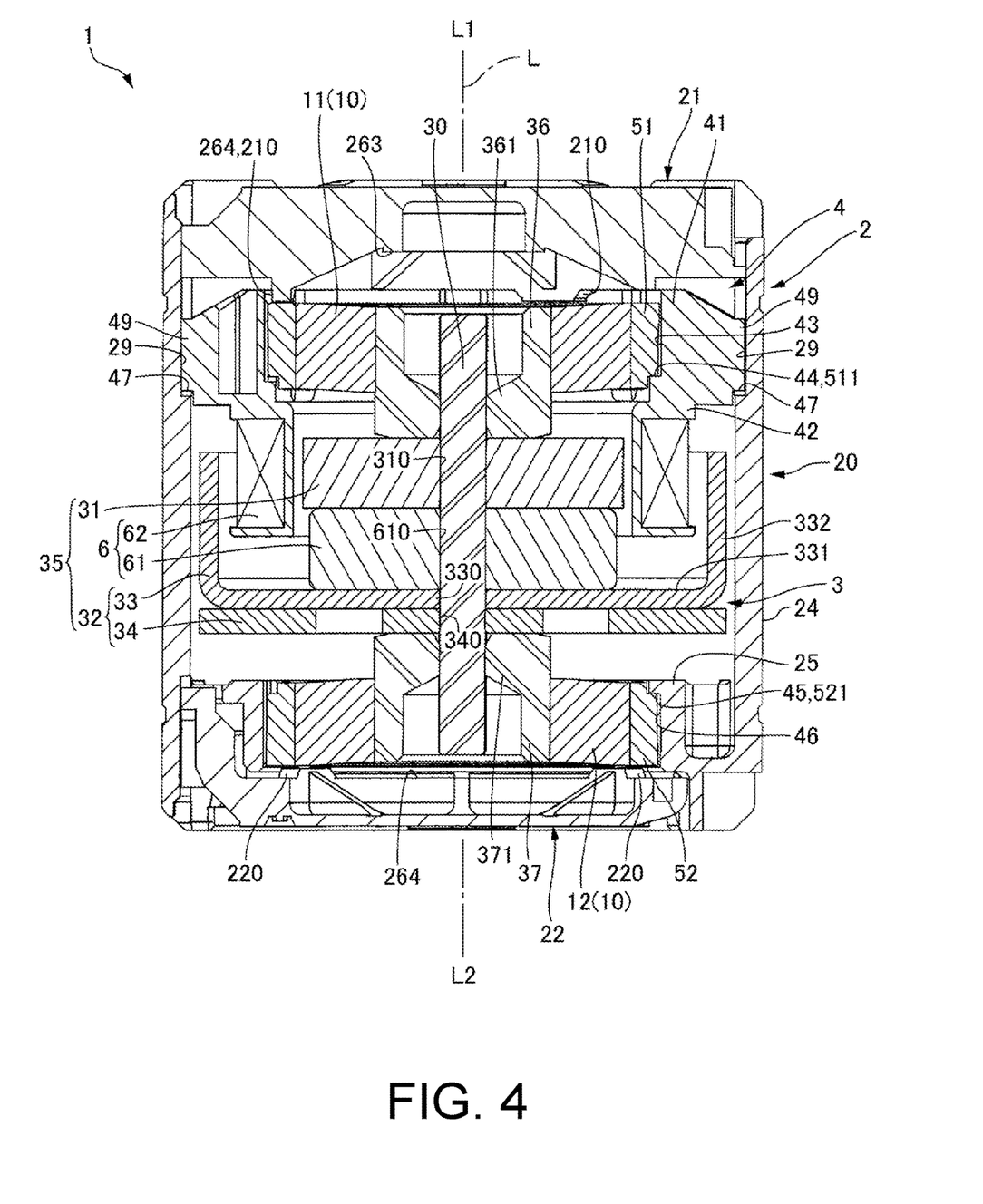
FIG. 4 is a B-B cross-sectional view of the actuator shown in FIG. 1 taken in a direction perpendicular to that of FIG. 3.

FIG. 1 is a perspective view of the actuator 1 according to an embodiment of the present invention. FIG. 2 is an exploded perspective view of the actuator 1 shown in FIG. 1. FIG. 3 and FIG. 4 are cross-sectional views of the actuator 1 shown in FIG. 1. FIG. 3 is a cross-sectional view of the actuator 1 taken along an A-A position shown in FIG. 1. FIG. 4 is a cross-sectional view of the actuator 1 taken along a B-B position shown in FIG. 1 and in a direction perpendicular to that of FIG. 3.

As shown in FIG. 1 to FIG. 4, the actuator 1 includes the support body 2, the movable body 3, the connecting body 10 connected to the support body 2 and the movable body 3, and the magnetic drive mechanism 6 to relatively move the movable body 3 with respect to the support body 2. The connecting body 10 has at least one of elasticity and viscoelasticity. The magnetic drive mechanism 6 includes the magnet 61 disposed on the movable body 3 and the coil 62 disposed on the support body 2, and relatively moves the movable body 3 with respect to the support body 2 in the axis direction. As shown in FIG. 3 and FIG. 4, the movable body 3 is connected to the support body 2 via each connecting bodies 10 at an end of the L1 side that is one side of the axial direction and at an end of the L2 side that is the other side of the axial direction.

[Support Body]

As shown in FIG. 2 to FIG. 4, the support body 2 includes a cylindrical case 20, a first lid member 21 to close an opening on the L1 side that is one side of the axial direction along an axial direction of the case 20, a second lid member 22 to close an opening on the L2 side that is the other side of the axial direction along the axial direction of the case 20, and a coil holder 4 disposed between the first lid member 21 and the second lid member 22 inwardly along the inner circumference of the case 20. In this embodiment, the case 20, the first lid member 21, the second lid member 22, and the coil holder 4 are made of resin. The support body 2 also include a first outer frame member 51 fitting inwardly along the inner circumference of the coil holder 4 and a second outer frame member 52 fitting inwardly along the inner circumference of the case 20 at a position spaced apart from the first outer frame member 51 to the L2 side that is the other side of the axial direction. The first outer frame member 51 and the second outer frame member 52 have the same shape and are disposed with orientations thereof being opposite to each other in the axial direction.

[Connecting Body]

The connecting body 10 includes an annular first connecting body 11 joined to an inner circumferential surface of the first outer frame member 51 and an annular second connecting body 12 joined to an inner circumferential surface of the second outer frame member 52. The first connecting body 11 is disposed on one end side of the axial direction of the movable body 3, and the second connecting body 12 is disposed on the other end side of the axial direction of the movable body 3. As described later, the first connecting body 11 and the second connecting body 12 are gel-like members molded of a gel material, and are joined to the first outer frame member 51 and the second outer frame member 52, respectively by adhesiveness of each gel-like member itself. In this embodiment the first connecting body 11 is connected to the support body 2 by press-fitting and fixing the first outer frame member 51 to the coil holder 4. Furthermore, the second connecting body 12 is connected to the support body 2 by press-fitting and fixing the second outer frame member 52 to the case 20.

[Coil Holder]

As shown in FIG. 2, the coil holder 4 includes an annular first outer frame member fixing portion 41 and a drum portion 42 projecting from the first outer frame member fixing portion 41 to the L2 side that is the other side of the axial direction, and a coil 62 is disposed to surround the drum portion 42. The ends of coil wires 63 drawn out from the coil 62 entwine two terminal pins 64 projecting radially outside from the first outer frame member fixing portion 41 of the coil holder 4. As shown in FIG. 1, the terminal pins 64 protrude outward from the case 20 and are connected to a wiring board 7.

As shown in FIG. 4, the coil holder 4 has a first step portion 44 for positioning the first outer frame member 51 in the axial direction. The first outer frame member fixing portion 41 surrounds an outer circumference of the first outer frame member 51. An inner circumferential surface of the first outer frame member fixing portion 41 has a first concave portion 43 recessed toward the L2 side that is the other side of the axial direction, and the first outer frame member 51 is press-fitted into the first concave portion 43. The first step portion 44 is provided at an end of the first concave portion 43 on the L2 side that is the other side of the axial direction along an axial direction of the first concave portion 43. In this embodiment, an annular step portion 511 formed on the outer circumferential surface of the first outer frame member 51 abuts the first step portion 44 in the axial direction.

[Case]

The case 20 has a cylindrical case body 24 and a second outer frame member fixing portion 25 disposed inwardly along the inner circumference of the case body 24. The second outer frame member fixing portion 25 is disposed at a position spaced apart from the coil holder 4 to the L2 side that is the other side of the axial direction. As shown in FIG. 2 and FIG. 4, the second outer frame member fixing portion 25 protrudes inwardly along the inner circumference from the inner circumferential surface of the case body 24, and is integrally molded with the case body 24.

The case 20 has a second step portion 45 for positioning the second outer frame member 52 in the axial direction. As shown in FIG. 3 and FIG. 4, the inner circumferential surface of the second outer frame member fixing portion 25 has a second concave portion 46 recessed toward the L1 side that is one side of the axial direction, and the second outer frame member 52 is press-fitted into the second concave portion 46. The second step portion 45 is provided at an end of the second concave portion 46 on the L1 side that is one side of the axial direction along an axial direction of the second concave portion 46. In this embodiment, an annular step portion 521 formed on the outer circumferential surface of the second outer frame member 52 abuts the second step portion 45 in the axial direction.

The case 20 has a third step portion 47 for positioning the coil holder 4 in the axial direction. As shown in FIG. 4, the third step portion 47 is formed on the inner circumferential surface of the case body 24. As shown in FIG. 1 and FIG. 4, on the inner circumferential surface of the case body 24 into which the coil holder 4 fits a plurality of groove portions 29 each extending in the axial direction are formed, and the third step portion 47 is formed at the end of the L2 side that is the other side of the axial direction along an axial direction of each groove portion 29. As shown in FIG. 2, the coil holder 4 has a plurality of convex portions 49 projecting from the outer circumferential surface of the first outer frame member fixing portion 41. When assembling the support body 2, convex portions 49 of the coil holder 4 are respectively fitted into groove portions 29 of the case body 24 from the L1 side that is one side of the axial direction and abut the third step portion 47 in the axial direction. This allows the coil holder 4 to be press-fitted and fixed to the case body 24, and positioned in the axial direction.

[Lid Member]

As shown in FIG. 3 and FIG. 4, the first lid member 21 is fixed to the case body 24 from the L1 side that is one side of the axial direction along an axial direction of the first outer frame member fixing portion 41 provided in the coil holder 4. The second lid member 22 is also fixed to the case body 24 from the L2 side that is the other side of the axial direction along an axis direction of the second outer frame member fixing portion 25. As shown in FIG. 2, viewing from the axial direction, each of the first lid member 21 and the second lid member 22 has a circular lid portion 26, and a plurality of locking portions 27 is arranged on an outer circumferential edge of the lid portion 26 at equal intervals along the circumference direction thereof. In this embodiment, the first lid member 21 and the second lid member 22 are each have three locking portions 27. The locking portion 27 is a claw portion which extends outwardly along the outer circumference from the lid portion 26 so as to incline with respect to the axial direction.

The locking portion 27 elastically deforms in the radial direction so as to be pushed into inwardly along the inner circumference of the case body 24 together with the lid portion 26. The case 20 has a restriction portion 28 to restrict the locking portion 27 coming off from the inside of the case 20. The restriction portion 28 is a convex portion projecting inwardly along the inner circumference from the edge of the case body 24.

As shown in FIG. 1 and FIG. 2, three restriction portions 28 are arranged at equal intervals each at the ends of the L1 side that is one side of the axial direction and the L2 side that is the other side of the axial direction, which is along the axial direction of the case body 24. The restriction portion 28 abuts a tip of the locking portion 27 in the axial direction.

The first lid member 21 is fixed to the case 20 by means of a combination of a locking structure consisting of the locking portion 27 and the restriction portion 28, and bonding by an adhesive. The adhesive is applied so as to become a sealant by itself to seal a gap between the end of the case 20 on the L1 side that is one side of the axial direction and the first lid member 21 after the adhesive is cured. Namely, in assembled support body 2 the gap between the first lid member 21 and the case 20 is sealed by the adhesive (not shown).

Similar to the first lid member 21, the second lid member 22 is fixed to the case 20 by means of a combination of the locking structure consisting of the locking portion 27 and the restriction portion 28, and bonding by the adhesive. The adhesive is applied so as to become a sealant by itself to seal a gap between the end of the case 20 on the L2 side that is the other side of the axial direction and the second lid member 22 after the adhesive is cured. Namely, in the assembled support body 2 the gap between the second lid member 22 and the case 20 is sealed by the adhesive (not shown).

As shown in FIG. 2, the first outer frame member fixing portion 41 of the coil holder 4 has groove portions 48 in which portions overlapping the three restriction portions 28 provided on the case body 24 in the axial direction are cut out inwardly along the inner circumference. Thereby, when inserting the coil holder 4 into the case body 24, interference between the first outer frame member fixing portion 41 and the restriction portion 28 can be avoided.

[Outer Frame Fixing Structure by the Lid Member]

In this embodiment, each of the connecting bodies 10 (i.e., the first connecting body 11 and the second connecting body 12) is disposed in a gap in a radial direction between the inner frame and the outer frame which surrounds the outer circumference of the inner frame, and connects the inner frame and the outer frame. As described above, the support body 2 includes the first outer frame member 51 as the outer frame, which is joined to the outer circumference of the first connecting body 11, and the second outer frame member 52 as the outer frame, which is joined to the outer circumference of the second connecting body 12. By attaching the first lid member 21 and the second lid member 22 to the case 20, the first outer frame member 51 and the second outer frame member 52 are pressed in the axial direction and held in place.

As shown in FIG. 2 and FIG. 4, the first lid member 21 has a pressing convex portion 210 which abuts the first outer frame member 51 from the L1 side that is one side of the axial direction. As described above, the first outer frame member 51 is fixed to the case 20 via the coil holder 4 and abuts the first step portion 44 of the coil holder 4 from one side L1 in the axial direction. As shown in FIG. 4, when the first lid member 21 is press-fitted and fixed to the end portion of the L1 side that is one side of the case 20, the first outer frame member 51 is pressed down by the pressing convex portion 210 of the first lid member 21.

As shown in FIG. 3 and FIG. 4, the second lid member 22 has a pressing convex portion 220 which abuts the second outer frame member 52 from the L2 side that is the other side of the axial direction. As described above, the second outer frame member 52 abuts the second step portion 45 of the second outer frame member fixing portion 25 integrally formed with the case 20 from the L2 side that is the other side of the axial direction. When the second lid member 22 is press-fitted and fixed to the end portion of the L2 side that is the other side of the case 20, the second outer frame member 52 is pressed up by the pressing convex portion 220 of the second lid member 22.

Figure 5:
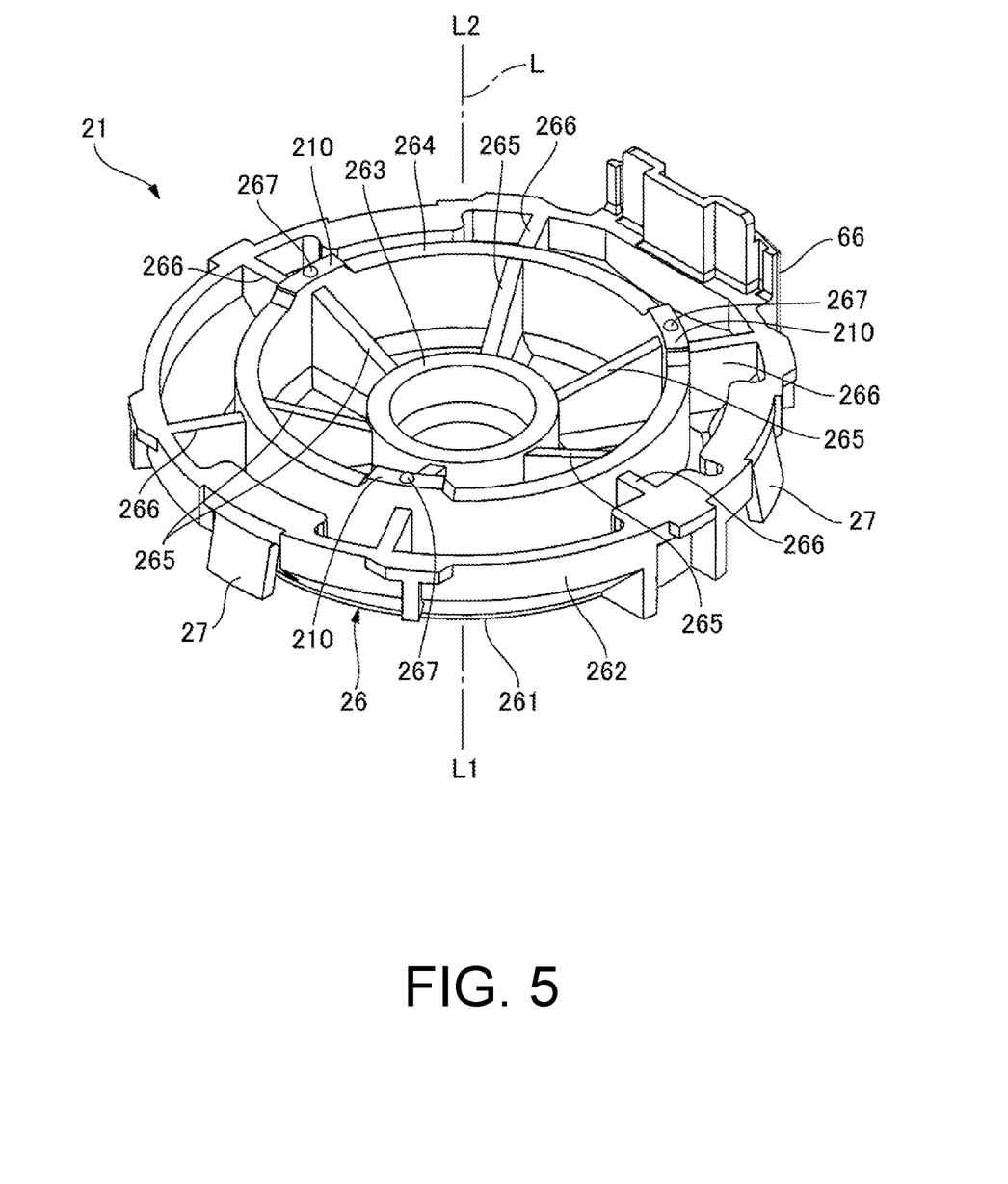
FIG. 5 is a perspective view of the first lid member.
Figure 6:
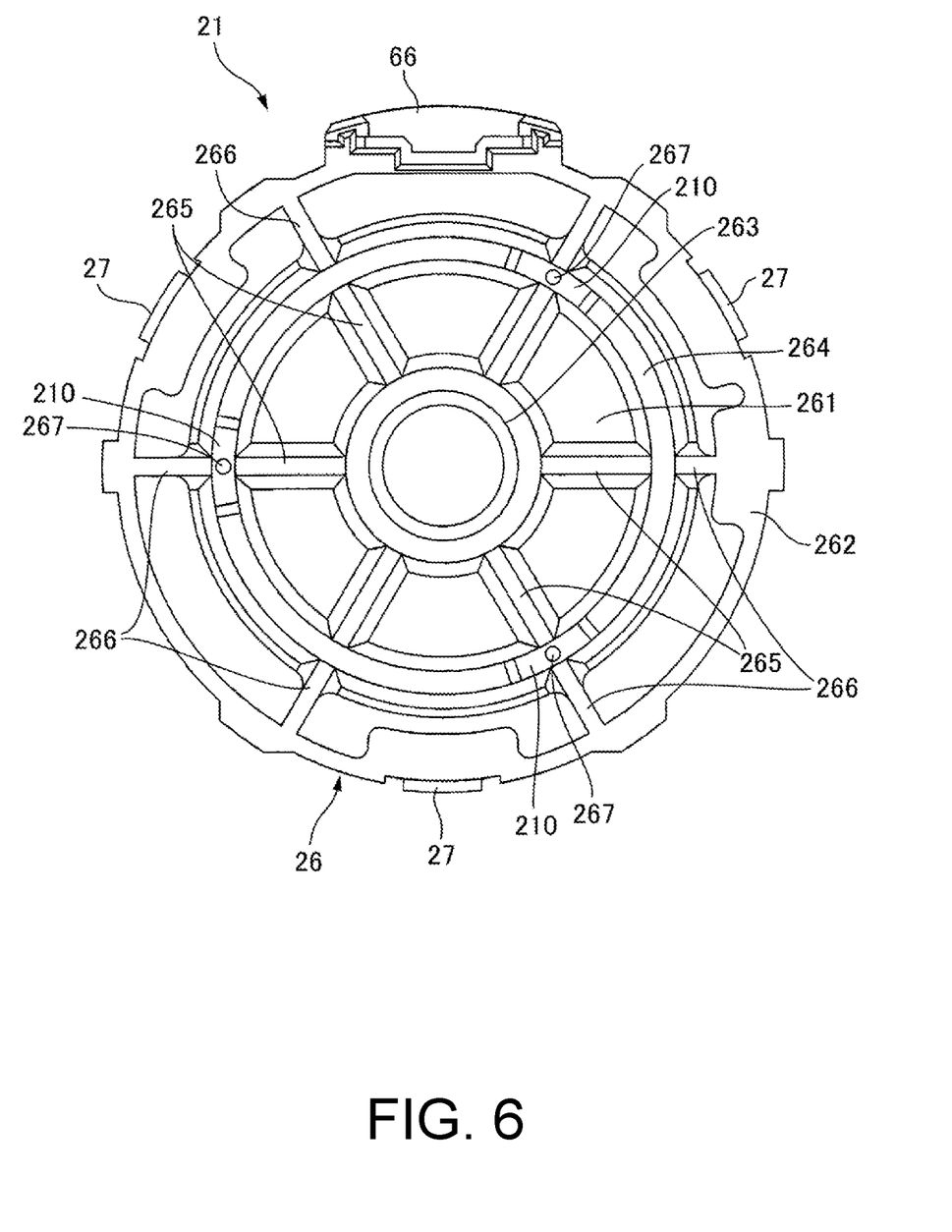
FIG. 6 is a plan view of the first lid member.
Figure 7:
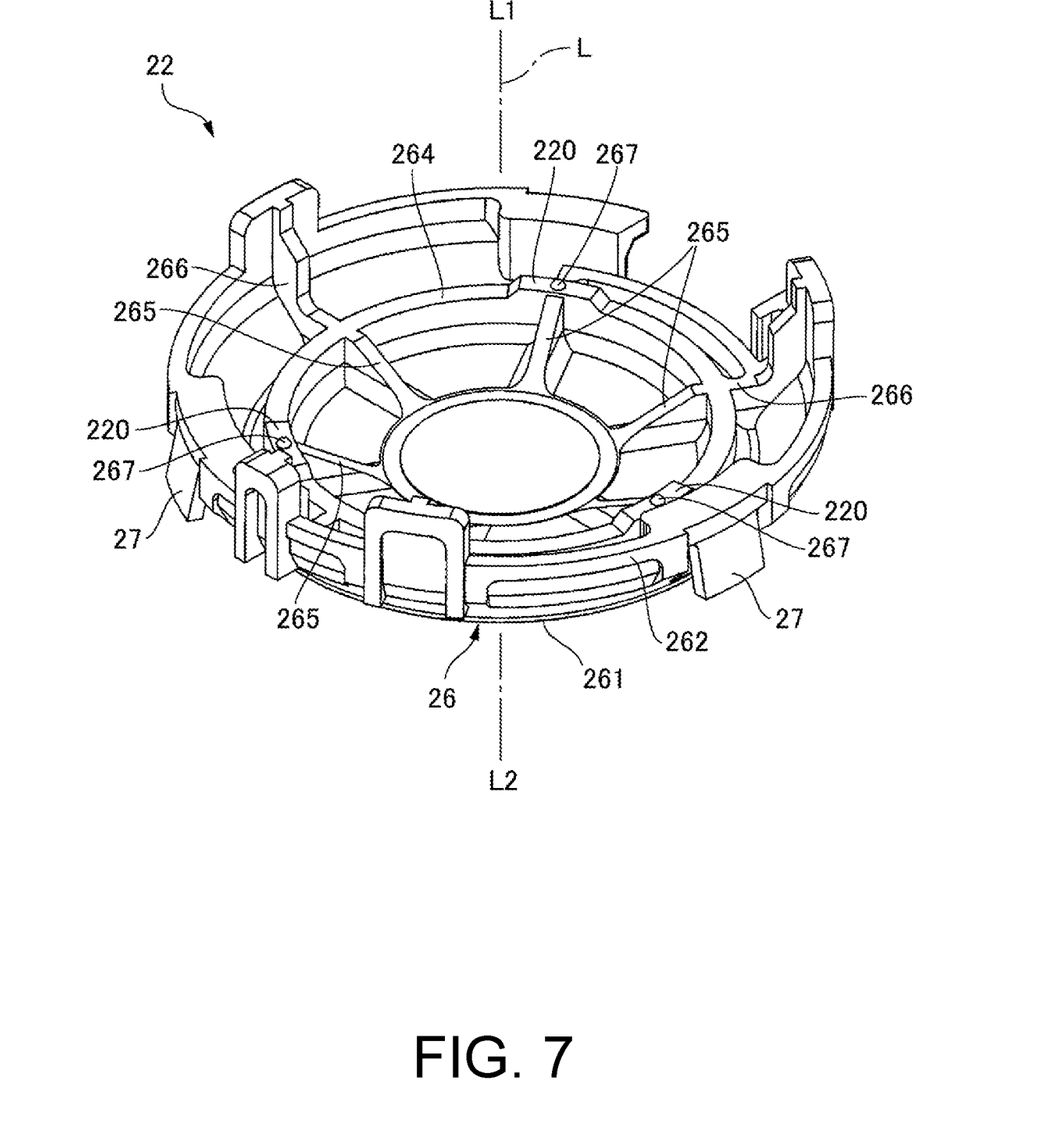
FIG. 7 is a perspective view of the second lid member.

FIG. 5 is a perspective view of the first lid member 21, and FIG. 6 is a plan view of the first lid member 21. FIG. 5 and FIG. 6 show such views as to be seen from the L2 side that is the other side of the axial direction. FIG. 7 is a perspective view of the second lid member 22, which is seen from the L1 side that is one side of the axial direction. As shown in FIG. 5 and FIG. 7, in the first lid member 21 and the second lid member 22, the lid portion 26 has: a plate portion 261 in circular shape; and an edge portion 262. The edge portion 262 includes a part extending along the axial direction, and a part extending outwardly along the outer circumference from an outer peripheral edge of the plate portion 261 so as to incline with respect to the axial direction.

As shown in FIG. 5, the first lid member 21 has a first annular rib 263 and a second annular rib 264, which project from the plate portion 261 to the L2 side that is the other side of the axial direction on the inner circumferential side of the edge portion 262.

The first annular rib 263 is disposed at the center of the plate portion 261, and the second annular rib 264 is disposed between the first annular rib 263 and the edge portion 262. The second annular rib 264 is connected to the first annular rib 263 with radial ribs 265, and connected to the edge portion 262 with radial ribs 266, in which the radial ribs 265 and 266 are arranged radially. As shown in FIG. 7, the second lid member 22 has the second annular rib 264 which projects from the plate portion 261 to the L1 side that is one side of the axial direction on the inner circumferential side of the edge portion 262, and the second annular rib 264 is connected to the edge portion 262 with the radial ribs 266 which are arranged radially. Furthermore, the radial ribs 265 are arranged so that each of which extends inward along the inner circumference from the second annular rib 264 in a radial direction.

As shown in FIG. 4, the second annular rib 264 in the first lid member 21 is disposed at a position overlapping the first outer frame member 51 as viewed from the axial direction. As shown in FIG. 5, the first lid member 21 has a plurality of pressing convex portions 210 projecting from a tip surface of the second annular rib 264 to the L2 side that is the other side of the axial direction. In this embodiment, three pressing convex portions 210 are provided on the first lid member 21 at equal intervals along the circumference direction of the second annular rib 264. Each of the pressing convex portions 210 has a trapezoid-like shape whose width along the circumference direction gradually decreases toward the tip thereof. Each of the pressing convex portions 210 has a hemisphere-like shaped plastic deformation portion 267 protruding from a tip surface thereof. When the pressing convex portion 210 is pressed against the first outer frame member 51, the plastic deformation portion 267 is pressed by the end surface of the first outer frame member 51 so that it collapses.

As shown in FIG. 3, the second annular rib 264 in the second lid member 22 is disposed at a position overlapping the second outer frame member 52 as viewed from the axial direction. As shown in FIG. 7, the second lid member 22 has a plurality of pressing convex portions 220 projecting from the tip surface of the second annular rib 264 to the L1 side that is one side of the axial direction. In this embodiment, three pressing convex portions 220 are provided at equal intervals along the circumference direction of the second annular rib 264. Each of the pressing convex portions 220 has the same shape as the pressing convex portion 210 of the first lid member 21, which is a trapezoid-like shape whose width along the circumference direction gradually decreases toward the tip thereof. Each of the pressing convex portions 220 has a hemisphere-like shaped plastic deformation portion 267 protruding from a tip surface thereof. When the pressing convex portion 220 is pressed against the second outer frame member 52, the plastic deformation portion 267 is pressed by the end surface of the second outer frame member 52 so that it collapses.

As described above, each of the first lid member 21 and the second lid member 22 has three locking portions 27 disposed at equal intervals along the outer circumferential surface thereof. As shown in FIG. 5 and FIG. 6, in the first lid member 21, a circumferential arrangement of the three locking portions 27 is different from that of the three pressing convex portions 210. On the other hand, as shown in FIG. 7, in the second lid member 22 the circumferential arrangement of the three locking portions 27 corresponds to that of the three pressing convex portions 220.

As shown in FIG. 5 and FIG. 6, in the first lid member 21 six radial ribs 266 connecting the second annular rib 264 and the edge portion 262 are disposed at equal intervals along the circumference direction thereof, and the circumferential arrangement of three of the six radial ribs 266 corresponds to that of the pressing convex portions 210. On the other hand, the circumferential arrangement of the locking portions 27 is different from that of the radial ribs 266. In the first lid member 21 each of the three locking portions 27 is disposed at a circumferentially intermediate position between circumferentially adjacent radial ribs 266.

As shown in FIG. 7, in the second lid member 22 six radial ribs 266 connecting the second annular rib 264 and the edge portion 262 are disposed at equal intervals along the circumference direction thereof, and the circumferential arrangement of three of the six radial ribs 266 corresponds to that of the pressing convex portions 220. Accordingly, in the second lid member 22 the pressing convex portions 220, the locking portions 27 and the radial ribs 266 have corresponding circumferential arrangements.

[Wiring Lead-Out Portion]

As shown in FIG. 1 and FIG. 3, the support body 2 includes a wiring lead-out portion 60 for leading out the terminal pins 64 with which the coil wires 63 are entwined, which are drawn out from the coil 62 of the magnetic drive mechanism 6.

The wiring lead-out portion 60 is a gap between a notch portion 65 (see FIG. 2), in which an edge of the L1 side that is one side of the axial direction of the case 20 is cut out toward the L2 side that is the other side L2 of the axial direction, and a cover 66 extending from a part of the outer peripheral edge of the first lid member 21 to the L2 side that is the other side of the axial direction. When fixing the first lid member 21 to the case 20, the cover 66 is inserted into the notch portion 65 from one side of the axial direction.

The first outer frame member fixing portion 41 of the coil holder 4 is disposed inwardly along the inner circumference of the notch portion 65.

In this embodiment, two terminal pins 64 extending outwardly along the outer circumference from the first outer frame member fixing portion 41 are disposed in the wiring lead-out portion 60. Each of the terminal pins 64 is entwined on its root side with the coil wire 63 drawn out from the coil 62.

The case 20 has a board fixing portion 69 formed on the other side L2 of the notch portion 65. An end of the wiring board 7, which is fixed to the board fixing portion 69, is disposed at the wiring lead-out portion 60. The terminal pins 64 are passed through holes formed on the wiring board 7 and electrically connected to lands provided on the wiring board 7. A lead wire 8 for supplying power to the coil 62 is connected to the wiring board 7. The board fixing portion 69 has a lead wire holding portion 690 which holds the lead wire 8 at a position adjacent to the wiring board 7 along the outer circumference surface. Furthermore, the board fixing portion 69 has a claw portion 691 to engage with the edge of the wiring board 7 disposed in the notch portion 65. The wiring board 7 is fixed to the board fixing portion 69 by means of a combination of a locking structure with the claw portion 691, and bonding by an adhesive.

[Movable Body]

As shown in FIG. 2 to FIG. 4, the movable body 3 has a shaft 30 extending in the axial direction at the radial center of the support body 2. The magnet 61 and a yoke 35 are fixed to the shaft 30 by a cylindrical first inner frame member 36 and a cylindrical second inner frame member 37. The shaft 30 is a round bar made of metal. The first inner frame member 36 and the second inner frame member 37 are cylindrical bodies which are made of metal, and the first inner frame member 36 and the second inner frame member 37 have circular through holes. The first inner frame member 36 and the second inner frame member 37 have the same shape and are disposed with orientations thereof being opposite to each other in the axial direction.

As shown in FIG. 3 and FIG. 4, the inner circumferential surface of the first inner frame member 36 has an annular protrusion portion 361 projecting inwardly along the radial direction at the end of the L2 side that is the other side of the axial direction. Accordingly, when the first inner frame member 36 is press-fitted into the shaft 30, the shaft 30 is press-fitted into the annular protrusion portion 361. Furthermore, the inner circumferential surface of the second inner frame member 37 has an annular protrusion portion 371 projecting inwardly along the radial direction at the end of the L1 side that is one side of the axial direction. Accordingly, when the second inner frame member 37 is press-fitted into the shaft 30, the shaft 30 is press-fitted into the annular protrusion portion 371.

The magnet 61 has a shaft hole 610 through which the shaft 30 penetrates, so that the magnet 61 is fixed at a substantial center of the shaft 30 in the axial direction. The yoke 35 includes a first yoke 31 overlapping the magnet 61 on the L1 side that is one side of the axial direction and a second yoke 32 overlapping the magnet 61 on the L2 side that is the other side of the axial direction. The first yoke 31 has a disc-like shape with a shaft hole 310 the shaft 30 penetrates. The second yoke 32 consists of two members, that is, a cup-like first magnetic member 33 and a disc-like second magnetic member 34. The first magnetic member 33 has a circular end plate portion 331 in which a shaft hole 330 the shaft 30 penetrates is provided, and a cylindrical portion 332 extending from a peripheral edge of the end plate portion 331 to the L1 side that is one side of the axial direction. In this embodiment, the end plate portion 331 of the first magnetic member 33 is fixed to the end surface of the magnet 61 on the L2 side that is the other side of the axial direction. The second magnetic member 34 has a shaft hole 340 the support shaft 30 penetrates, and is fixed to an end surface of the end plate portion 331 of the first magnetic member 33, which is an opposite side surface with respect to the magnet 61.

In the movable body 3, while the shaft 30 penetrates the shaft holes 310, 610, 330, and 340 of members constituting the magnet 61 and the yoke 35, the first inner frame member 36 and the second inner frame member 37 are fixed to the shaft 30 at the side of the yoke 35 and at the side of the magnet 61 in the axial direction, respectively. As a result, the first inner frame member 36 supports the magnet 61 and the yoke 35 from the L1 side that is one side of the axial direction, as well as the second inner frame member 37 supports the magnet 61 and the yoke 35 from the L2 side that is the other side of the axial direction, so that the magnet 61 and the yoke 35 are fixed to the support shaft 30.

In the second yoke 32, an inner diameter of the cylindrical portion 332 of the first magnetic member 33 is larger than an outer diameter of the magnet 61 and the first yoke 31. Accordingly, when the magnet 61 and the first yoke 31 are stacked on the circular end plate portion 331, which is a bottom of the cylindrical portion 332, the cylindrical portion 332 faces the outer circumferential surface of the magnet 61 and the outer circumferential surface of the first yoke 31 with radially spaced apart from each other. In this embodiment, a part of the coil 62 is disposed between the cylindrical portion 332 and the outer circumferential surface of the magnet 61. In addition, a part of the coil 62 is disposed between the cylindrical portion 332 and the outer circumferential surface of the first yoke 31.

[Method of Manufacturing the Connecting Body]

In this embodiment, the first and second connecting bodies 11 and 12 are gel-like members molded of a gel material. The molding of the first connecting body 11 includes coaxially positioning the first outer frame member 51 and the first inner frame member 36 with a jig to form an annular gap between the first outer frame member 51 and the first inner frame member 36, filling the gap with a gel material, and curing the same by heating. As a result, the first connecting body 11 is joined to the inner circumferential surface of the first outer frame member 51 as well as the outer circumferential surface of the first inner frame member 36 by the adhesiveness of the gel-like member itself. Prior to filling the gap with the gel material, an adhesion promoter such as a primer may be applied to the inner circumferential surface of the first outer frame member 51 and the outer circumferential surface of the first inner frame member 36 in order to increase a joint strength. Similarly, the molding of the second connecting body 12 includes forming an annular gap between the second outer frame member 52 and the second inner frame member 37, filling the gap with the gel material, and curing the same by heating.

In this embodiment, each of the connecting bodies 10 (i.e., the first connecting body 11 and the second connecting body 12) is disposed in the gap in a radial direction between the inner frame and the outer frame which surrounds the outer circumference of the inner frame, and formed as a component such as a dumper member which connects the inner frame and the outer frame with the connecting body 10. Namely, the first connecting body 11 is formed as a component by joining the first outer frame member 51 (i.e., the outer frame) and the first inner frame member 36 (i.e., the inner frame) on molding. Similarly, the second connecting body 12 is also formed as a component by joining the second outer frame member 52 (i.e., the outer frame) and the second inner frame member 37 (i.e., the inner frame) on the molding. Accordingly, it is possible to assemble the actuator 1 by connecting the support body 2 and the movable body 3 without a process of adhering the gel-like member.

The first connecting body 11 and the second connecting body 12 are viscoelastic members. For example, as the first and second connecting bodies 11 and 12, it is possible to employ gel-like materials consisting of silicone gel or the like, various rubber materials such as natural rubber, diene-based rubber (e.g., styrene-butadiene rubber, isoprene rubber, butadiene rubber, chloroprene rubber, acrylonitrile butadiene rubber, etc.), non-diene-based rubber (e.g. butyl rubber, ethylene-propylene rubber, ethylene-propylene-diene rubber, urethane rubber, silicone rubber, fluororubber, etc.), thermoplastic elastomers, and the like, and modified materials thereof. In this embodiment, the first and second connecting bodies 11 and 12 are made of a silicone gel having a penetration degree of 90 to 110.

[Air Passage]

The actuator 1 is configured to locate a cylindrical connecting body 10 in the radial gap between the movable body 3 and the support body 2 so as to connect the movable body 3 and the support body 2 over the entire circumference of the gap. Therefore, the inner space of the case 20 in the actuator 1 is isolated by the connecting body 10 in the axial direction. A first air passage P1 is provided outside of the outer circumference of the first connecting body 11 in order to increase an air flow in the inner space of the case 20. In addition, a second air passage P2 is provided outside of the outer circumference of the second connecting body 12. As a result, since the air flow in the inner space of the case 20 is improved, it is possible to minimize air resistance which causes when the movable body 3 oscillates.

As shown in FIG. 3, a plurality of groove portions 93 extending in the axial direction are formed on the inner circumferential surface of the first outer frame member fixing portion 41 at equal intervals. When the first outer frame member 51 is press-fitted inwardly along the inner circumferential surface of the first outer frame member fixing portion 41, the first air passage P1 is formed between the outer circumferential surface of the first outer frame member 51 and the groove portion 93. The first air passage P1 interconnects with a gap between the drum portion 42 of the coil holder 4, and the first yoke 31 and the magnet 61. Furthermore, the case 20 includes a plurality of penetration portions 94 penetrating the second outer frame member fixing portion 25. The penetration portions 94 are formed along the circumference direction at equal intervals and serve as the second air passages P2.

[Operation of the Actuator]

In the actuator 1 the magnetic drive mechanism 6 generates driving force to drive the movable body 3 in the axial direction by energizing the coil 62. When the coil 62 is deenergized, the movable body 3 returns to an origin position by return force of the connecting body 10. Consequently, the movable body 3 oscillates in the axis direction by intermittently energizing the coil 62. Furthermore, it is possible to adjust the AC waveform applied to the coil 62 such that an acceleration with which the movable body 3 moves to the L1 side that is one side of the axial direction is different from an acceleration with which the movable body 3 moves to the L2 side that is the other side of the axial direction. Therefore, a user who holds a tactile device to which the actuator 1 is attached can get a bodily sensible vibration with an orientation in the axial direction. The actuator 1 can also be used to constitute an audio speaker.

When the movable body 3 oscillates in the axial direction with respect to the support body 2, the first and second connecting bodies 11 and 12 deform in the shearing direction by following the oscillation of the movable body 3. The gel-like materials such as silicone gel have linear or non-linear stretchability characteristics depending on the direction of expansion and contraction. When the gel-like material deforms in the shearing direction, a linear component of the gel-like material has larger deformation characteristic than a nonlinear component thereof. Accordingly, when the movable body 3 oscillates in the axial direction with respect to the support body 2, since the first and second connecting bodies 11 and 12 deform within a range of high linearity, improved vibration characteristics with a good linearity can be obtained.

When the movable body 3 moves in the radial direction, the first and second connecting bodies 11 and 12 are deformed in a collapsing direction. Here, a spring constant with which the gel-like member is deformed in the collapsing direction is around three times a spring constant with which the gel-like member is deformed in the shearing direction. As a result, it is possible to suppress the movement of the movable body 3 in a direction different from the oscillation direction (i.e., the axial direction) as well as collision between the movable body 3 and the support body 2.

[The Main Effect of this Embodiment]

As described above, an actuator 1 according to the present embodiment includes: a support body 2 and a movable body 3; a connecting body 10 (i.e., a first connecting body 11 and a second connecting body 12) connected to the support body 2 and the movable body 3, including at least one of elasticity and viscoelasticity; and a magnetic drive mechanism 6 including a magnet 61 and a coil 62, to cause the movable body 3 to relatively move with respect to the support body 2. The movable body 3 includes a shaft 30 to support the magnet 61 at the inside of an inner circumference of the support body 2, and a first inner frame member 36 and a second inner frame member 37 (i.e., an inner frame) which are fixed to the shaft 30. The support body 2 includes: a first outer frame member 51 and a second outer frame member 52 (i.e., an outer frame) which face the first inner frame member 36 and the second inner frame member 37 (i.e., an inner frame) in a radial direction; a cylindrical case 20 which surrounds the outside of an outer circumference of the first outer frame member 51 and the second outer frame member 52 (i.e., an outer frame); and a first lid member 21 and a second lid member 22 (i.e., a lid member) which close ends of the case 20. The inner frame is connected to the outer frame by the connecting body 10 (i.e., a first connecting body 11 and a second connecting body 12) with a cylindrical shape which is disposed in a gap between the inner frame and the outer frame. The first lid member 21 includes a pressing convex portion 210 which abuts the first outer frame member 51 in the axial direction. Furthermore, the second lid member 22 includes a pressing convex portion 220 which abuts the second outer frame member 52 in the axial direction. Three pressing convex portions 210 and three pressing convex portions 220 are arranged at positions spaced apart from each other along a circumference, respectively.

In this embodiment, since the number of the pressing convex portions 210 provided on the first lid member 21 and the number of the pressing convex portions 220 provided on the second lid member 22 are both limited to three, when fixing the first outer frame member 51 and the second outer frame member 52 (i.e., an outer frame) to the case 20 by the first lid member 21 and the second lid member 22, respectively, all of the pressing convex portions 210 abut the first outer frame member 51 and all of the pressing convex portions 220 abut the second outer frame member 52. As a result, when the movable body 3 oscillates, it is possible to avoid that the first lid member 21 collides with the first outer frame member 51 and that the second lid member 22 collides with the second outer frame member 52. Therefore, the chattering noise can be suppressed.

In this embodiment, a locking portion 27 provided on the first lid member 21 and the second lid member 22 abuts the restriction portion 28 of the case 20, so that the restriction portion 28 restricts the first lid member 21 and the second lid member 22 coming off from the case 20. Here, in the first lid member 21, a circumferential arrangement of the pressing convex portion 210 is different from that of the locking portion 27. When the pressing convex portion 210 abuts the first outer frame member 51, it becomes difficult for the abutted portion to flex. By shifting the position of the pressing convex portion 210 with respect to that of the locking portion 27, it is possible to avoid that it becomes difficult for the portion provided with the locking portion 27 to flex. This allows the locking portion 27 to avoid that it becomes difficult to lock it to the restriction portion 28 when fixing the first lid member 21 to the case 20. Therefore, it is possible to avoid that it becomes difficult to fix the first lid member 21 to the case 20.

In this embodiment, the first lid member 21 and the second lid member 22 are press-fitted into the ends of the case 20, and the locking portion 27 is a claw portion which elastically deforms in the radial direction and elastically contact an inner circumferential surface of the case 20. In this way, by shifting a position of the pressing convex portion 210 with respect to a position of the claw portion in the first lid member 21, it is possible to avoid that it becomes difficult to lock the claw portion to the restriction portion. Therefore, it is possible to avoid that it becomes difficult to fix the first lid member 21 to the case 20.

In this embodiment, the pressing convex portions 210, 220 are arranged along the circumference direction at equal intervals. Arranging the pressing convex portions 210, 220 along the circumference direction at equal intervals makes it difficult to cause a space between the pressing convex portions 210 as well as a space between the pressing convex portions 220 to be narrower. Accordingly, when the circumferential arrangement of the pressing convex portion 210 is shifted with respect to the circumferential arrangement of the locking portion 27 along the circumference direction as in the first lid member 21, it is hard to make a distance between the pressing convex portion 210 and the locking portion 27 narrow. Accordingly, it is easy to fix the first lid member 21 and the second lid member 22 to the case 20 since the portion provided with the locking portion 27 is easy to flex.

In this embodiment, the support body 2 includes a first step portion 44 for positioning the first outer frame member 51 in the axial direction and a second step portion 45 for positioning the second outer frame member 52 in the axial direction. The pressing convex portion 210 abuts the first outer frame member 51 from the opposite side of the first step portion 44, and the pressing convex portion 220 abuts the second outer frame member 52 from the opposite side of the second step portion 45. Accordingly, since the first outer frame member 51 and the second outer frame member 52 are sandwiched from both sides in the axial direction and held in place, when the movable body 3 oscillates, it is possible to avoid the first outer frame member 51 and the second outer frame member 52 from moving and generating a chattering sound.

In this embodiment, each of the first lid member 21 and the second lid member 22 includes a plastic deformation portion 267 which protrudes from a tip surface of each of the pressing convex portions 210, 220. Accordingly, it is possible to press and collapse the plastic deformation portion 267 between the first lid member 21 and the first outer frame member 51 as well as between the second lid member 22 and the second outer frame member 52. Therefore, even if the accuracy of parts or assembly is low, it is possible to cause the pressing convex portions 210, 220 to abut the first outer frame member 51 and the second outer frame member 52, respectively.

Alternative Examples (1) In the above described embodiment, although the number of each of the pressing convex portions 210 and the pressing convex portions 220 is three, the number of each of the pressing convex portions 210 and the pressing convex portions 220 may be two.

(2) In the above described embodiment, although each of the pressing convex portions 210 and the pressing convex portions 220 are arranged along the circumference direction at equal intervals, they may be arranged at unequal intervals. However, the equal intervals are preferable.

(3) In the above described embodiment, although in the second lid member 22 the circumferential arrangement of the pressing convex portions 220 corresponds to that of the locking portions 27, it is preferable that the circumferential arrangement of the pressing convex portions 220 does not correspond to that of the locking portions 27 in the same manner to be nonaligned as in the first lid member 21. This allows the second lid member 22 to avoid that it becomes difficult to fix it to the case 20.

(4) It is preferable that the pressing convex portions 210 of the first lid member 21 and the pressing convex portions 220 of the second lid member 22 are both disposed at each intermediate position between the locking portions 27 adjacent to each other along the circumference direction. In this way, the pressing convex portions 210 and the pressing convex portions 220 can be placed at the most distant position from each of the locking portions 27. Therefore, since this allows the locking portions 27 to avoid that it becomes difficult to lock them to the restriction portions 28, it allows the first lid member 21 and the second lid member 22 to avoid that it becomes difficult to fix them to the case 20.

What is claimed is:

1. An actuator comprising:
a support body and a movable body;
a connecting body, connected to the support body and the movable body, having at least one of elasticity and viscoelasticity; and
a magnetic drive mechanism, having a magnet and a coil, and being configured to cause the movable body to relatively move with respect to the support body,
wherein one of the movable body and the support body comprises:
a shaft to support one of the magnet and the coil at inside of an inner circumference of the other of the movable body and the support body; and
an inner frame that surrounds outside of an outer circumference of the shaft,
wherein the other of the movable body and the support body comprises:
an outer frame that faces the inner frame in a radial direction;
a case with a cylindrical shape that surrounds outside of an outer circumference of the outer frame; and
a lid member that closes an end of the case,
wherein the inner frame is connected to the outer frame by the connecting body with a cylindrical shape that is disposed in a gap between the inner frame and the outer frame,
the lid member comprises:
a plate portion;
an edge portion extending from an outer peripheral edge of the plate portion along an axial direction of the shaft; and
a first annular rib and a second annular rib, which project from the plate portion in the axial direction on an inner circumferential side of the edge portion,
the first annular rib is disposed at a center of the plate portion, and the second annular rib is disposed between the first annular rib and the edge portion,
the second annular rib is connected to the first annular rib with radial ribs, and connected to the edge portion with radial ribs, in which the radial ribs are arranged radially,
the second annular rib is disposed at a position overlapping the outer frame as viewed in the axial direction, and a tip surface of the second annular rib comprises a plurality of pressing convex portions that project from the tip surface of the second annular rib in the axial direction and abuts the outer frame, and
the plurality of pressing convex portions are arranged at positions spaced apart from each other along a circumference direction.

2. The actuator according to claim 1, wherein
the case comprises a restriction portion configured to abut a locking portion provided on the lid member, and the restriction portion is configured to restrict the lid member coming off from the case,
a circumferential arrangement of the plurality of pressing convex portions is different from that of the locking portion.

3. The actuator according to claim 2, wherein
the lid member is configured to be press-fitted into the end of the case,
the locking portion is a claw portion that elastically deforms in the radial direction and elastically contact an inner circumferential surface of the case.

4. The actuator according to claim 2, wherein
the locking portion includes a plurality of locking portions that are spaced apart along the circumference direction,
each pressing convex portion among the plurality of pressing convex portions is disposed at an intermediate position between two adjacent locking portions among the plurality of locking portions.

5. The actuator according to claim 1, wherein
the plurality of pressing convex portions are arranged along the circumference direction at equal intervals.

6. The actuator according to claim 1, wherein
the lid member comprises a plastic deformation portion that protrudes from a tip surface of each of the plurality of pressing convex portions.

* * * * *